March 15, 1960     P. ZAMPOL     2,928,734
METHOD OF PHOTOGRAPHY
Filed Nov. 15, 1954
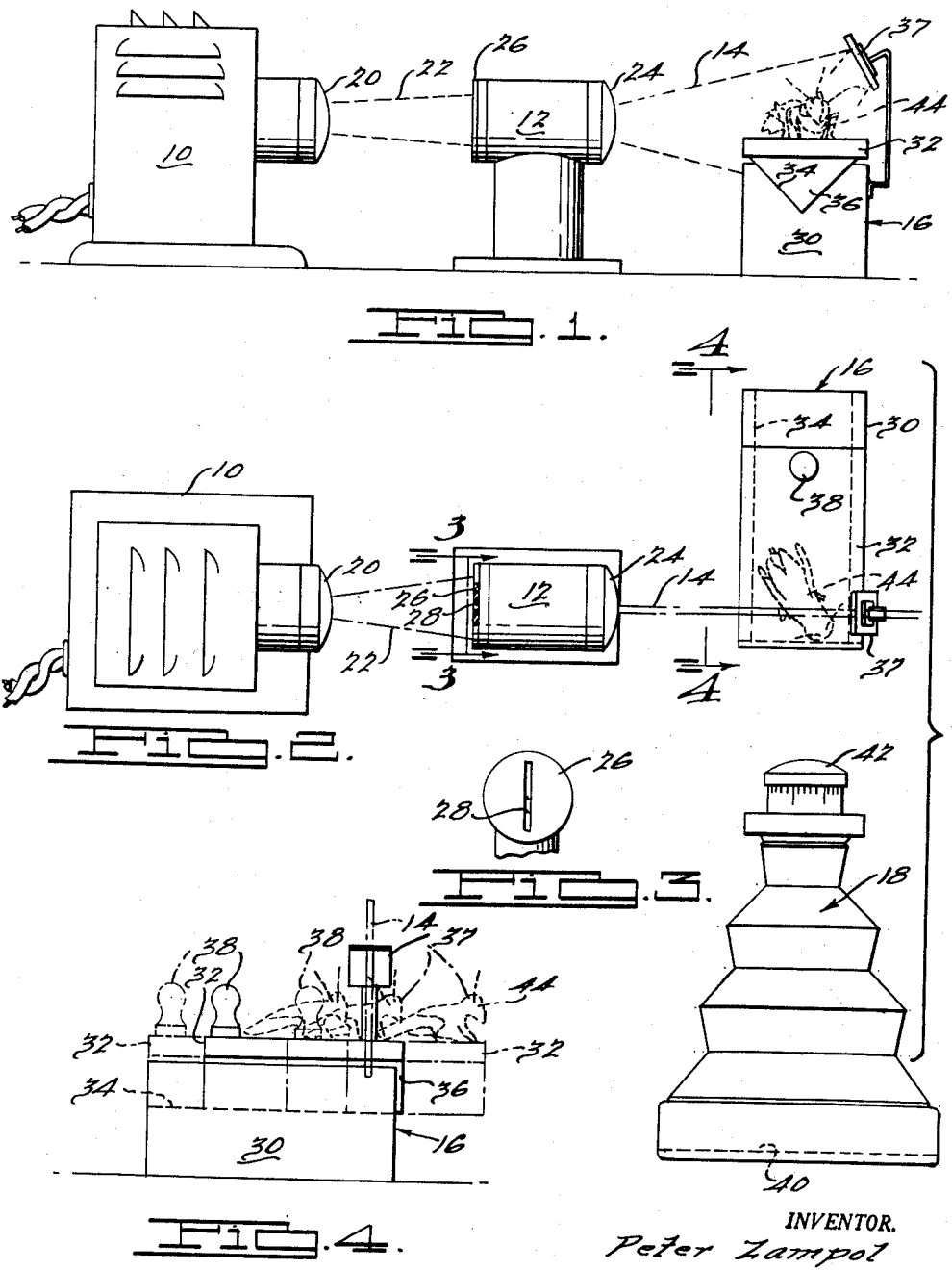
INVENTOR.
Peter Zampol
BY
Harness, Dickey & Pierce
ATTORNEYS

2,928,734

METHOD OF PHOTOGRAPHY

Peter Zampol, Pontiac, Mich.

Application November 15, 1954, Serial No. 468,687

4 Claims. (Cl. 96—27)

The present invention relates to an improved method of photography, the use of which makes possible the obtaining of photographs taken at very close range, in which the entire object is in proper focus even though it may have a relatively large dimension measured in a line between the object and the camera. It will be appreciated from a complete understanding of the present invention that the improved method of photography thereof may be used in taking photographs at any range where the depth of field of the camera is insufficient to include the entire object or group of objects which are desired to be included in the photograph.

It is well known that in previously known methods of photography, when using cameras for enlarging objects photographed at very short ranges, the depth of field is very shallow. Because of this inherent characteristic of lens optics, in taking photographs very close to the object, such for example, as when the lens of a camera is only a very few inches from the object, and when what is referred to as an enlarging or short focal length lens is used, it is only possible to have the entire object in good focus if the object has a very short dimension measured along a line between the object and the camera lens. In other words, the depth of field of cameras used for taking enlarged photographs with the object at a very short distance, is very small and in many cases is a small fraction of an inch. For this reason it has been impossible by previously known methods of photography to take good photographs of this type, of objects other than substantially flat surfaces. Also, in many other instances the depth of field of the camera may be insufficient at the range at which it is desired to take the photograph, to include all of the object or combination of objects to be photographed.

It is an object of the present invention to provide an improved method of photography by the use of which it is possible to take photographs of objects having a relatively large dimension measured along a line between an object and the camera, with a camera having a very shallow depth of field and which photographs show all parts of the object in accurate focus. Such photographs in which all parts of the object are in proper focus, are referred to in this application as having infinite depth of focus.

It is a further object of this invention to provide such an improved method of photography which may be readily carried out with relatively inexpensive additional equipment.

In the improved method of photography of the present invention, the object to be photographed is progressively illuminated, each part being illuminated while, and only while, that part is so disposed relative to the camera that its image falls upon a light sensitive film within the camera. More specifically, the improved method of photography of the present invention includes the steps of providing a thin sheet of light in an otherwise darkened area and effecting a relative movement of the object to be photographed and the thin sheet of light so that the object moves through the sheet of light while maintaining a camera so disposed and adjusted that the image of the portion of the object which is illuminated by the sheet of light falls upon the light sensitive film within the camera. In employing the method of the present invention, if the camera is maintained in a fixed position relative to the thin sheet of light, a photograph is obtained which is similar to an orthographic projection of the object, in that all parts of the object are photographed while they are at the same distance from the camera.

When, in practicing the improved method of photography of the present invention, the object is moved along a line between the object and the camera, a photograph simulating an undistorted orthographic projection of the object is obtained. This photograph may, of course, be on an enlarged scale.

The movement of the thin sheet of light relative to the object may, of course, be obtained in any suitable way. For example, the thin sheet of light may be stationary and the object may be moved through the sheet of light or the object may be stationary and the sheet of light may be moved so as to pass over the object. It will be appreciated, of course, that in the above described method of obtaining photographs similar to an orthographic projection, if the object is stationary and the light is moved so as to pass over the object, the camera will also be moved since in this method the camera is maintained in a fixed position relative to the thin sheet of light.

It will be readily appreciated by those skilled in the art that the methods of photography of the present invention may be carried out through the use of a wide variety of different types of equipment. In an illustrative, but not in a limiting sense, one form of apparatus is somewhat diagrammatically illustrated in the accompanying drawing wherein:

Figure 1 is a view in elevation showing one form of apparatus for use in supporting the object to be photographed and providing a thin sheet of light during the use of one of the methods of photography of the present invention;

Figure 2 is a plan view of the structure illustrated in Figure 1 and also showing the position of the camera;

Figure 3 is a detail view of the structure illustrated in Figure 2, taken substantially along the line 3—3 of Figure 2; and Figure 4 is a detail view of the structure illustrated in Figure 2, taken substantially along the line 4—4 of Figure 2 and showing three positions assumed by the object support during the practicing of one of the methods of photography of the present invention.

While it will be readily appreciated by those skilled in the art that the methods of photography of the present invention may be used in a wide variety of applications in the fieluds of science, industry and education, and may be used in photographing a wide variety of objects, the apparatus illustrated in the drawing is shown and described herein in connection with the photographing of a grasshopper.

The apparatus generally comprises a light source 10, apparatus 12 for receiving light from the light source 10 and projecting a thin sheet of light indicated at 14, a support 16 for the object to be photographed and a camera 18. The light source 10 may be any suitable source of light such, for example, as a conventional projector from which light is directed through a lens 20. The apparatus 12 which receives the light from the light source 10, which is represented in the drawing at the reference character 22, and which provides the thin sheet of light 14, includes a lens 24 suitably supported, and means such as a plate 26 disposed intermediate the light source lens 20 and the lens 24, and having a narrow vertical slot 28. The support 16 for the object includes a base 30 upon which is mounted a platform 32 supported for movement along a straight line relative to the base 30. In the construction illustrated, the base 30 is for this purpose provided with a V-groove 34 in which is received a longitudinally extending similarly V-shaped projection 36 formed on the platform 32.

In the construction illustrated, a mirror 37 is mounted on the base 30 for reflecting light onto the side of the object remote from the light source 10. This may be used as a satisfactory substitute for another light source and associated means for providing a thin sheet of light.

In the broader aspects of the present invention the platform 32 may be moved by any suitable means. In the construction illustrated, the platform 32 is provided with a handle 38 for movement of the platform 32. The camera 18 may be of any suitable construction adapted for taking pictures within the desired ranges and is diagrammatically illustrated as being a bellows-type camera in which the light sensitive film is supported in the position illustrated by the dotted line 40 and the camera lens 42 may be accurately adjusted toward and from the plane indicated by the line 40 for effecting accurate focus of the camera. Cameras of this type conventionally are provided with a ground glass which is disposed in the position indicated at 40 during focusing of the camera and which is movable from this position to permit the film to occupy this position during its exposure in the taking of the picture.

In using the above described apparatus in practicing one of the methods of photography embodying the present invention, the light source 10, the light shaping apparatus 12, the base 30 of the support 16 for the object to be photographed, and the camera 18 are all stationary relative to one another and are so disposed that the line of movement of the platform 32 is at right angles to the sheet of light 14, and the camera is so disposed that the movement of the platform 32 is along a line intersecting and perpendicular to the plane indicated by the line 40, in which the light sensitive film is disposed during the taking of the picture. The camera 18 is so adjusted that the image of the part of the object illuminated by the thin sheet of light 14 falls upon the ground glass which is disposed in the plane indicated by the line 40 during the adjustment of the camera.

The platform 32, carrying the object to be photographed, which in the drawing is shown to be the grasshopper 44, is movable on the base 30 so as to move the grasshopper 44 completely through the thin sheet of light 14. In Figure 4 the platform 32 is shown in full lines in an intermediate position in which a part of the body of the grasshopper is illuminated by the sheet of light 14. In broken lines to the left of this full line position is illustrated a broken line position of the platform 32 in which the grasshopper 44 is disposed completely to one side of the sheet of light 14. Also, there is shown in Figure 4 a second broken line position of the platform 32 to the right of the full line position and in which the grasshopper 44 is disposed completely on the other side of the sheet of light 14. It will, therefore, be apparent that during movement of the platform 32 between the two broken line positions illustrated in Figure 4, the grasshopper 44 is moved completely through the sheet of light 14.

During the taking of photographs through the use of the improved methods of photography embodying the present invention, it will, of course, be appreciated that the speed of movement of the platform 32 is so related to the degree of illumination provided by the sheet of light 14 and the aperture setting of the camera 18, as well as the speed of the light sensitive film used, as to provide a proper exposure of the film.

It will also be appreciated that in practicing the above described methods of photography, the sheet of light should be maintained sufficiently thin to avoid blurring of the picture by the movement of the object. In another modification of the method of photography of the present invention, an intermittent light source may be used to provide a series of light flashes and the thickness of the sheet of light provided during these flashes may be not more than equal to the depth of field of the camera. In this modified form of the present invention the object is moved a distance equal to the thickness of the sheet of light between the flashes of light. The duration of the flash may be sufficiently short to prevent blurring even though the object movement is continuous.

The term "camera," as used throughout the appended claims, includes any auxiliary lens or lenses which may be used.

While various forms of the improved method of photography of the present invention have been illustrated and described herein, it will be readily appreciated by those skilled in the art that numerous modifications and changes may be made therein without departing from the spirit of the present invention.

What is claimed is:

1. A method of photography useful for taking photographs all parts of which are in proper focus with a camera which is so adjusted that its depth of field is substantially less than the dimension of the object photographed measured at right angles to the photograph, said method comprising providing a thin sheet of light, maintaining a camera in fixed relation to said sheet of light with a light sensitive film in fixed relation therein and parallel to said sheet of light and maintaining said camera in fixed adjustment such that said camera is focused on said sheet of light so that the image of portions of said object illuminated by said sheet of light will fall on said light sensitive film, and progressively moving said object at right angles to and through said sheet of light while so maintaining said camera in said fixed relation relative to said sheet of light and so maintaining said camera in said fixed adjustment, said sheet of light being at least as thin as the depth of field of said camera when in said fixed adjustment.

2. A method of photography as defined in claim 1 including periodically interrupting the light source for said sheet of light and moving said object relative to said sheet of light a distance equal to the thickness of said sheet of light between the beginnings of successive flashes of said sheet of light.

3. A method of photography as defined in claim 1 wherein the light source is interrupted during said movement of said object relative to said sheet of light and all of said movement occurs during said interruptions.

4. A method of photography as defined in claim 1 wherein said object is moved steadily relative to said sheet of light and said sheet of light is of a thickness such that said relative movement does not produce an objectionable blurring of the image.

References Cited in the file of this patent

UNITED STATES PATENTS

| | | |
|---|---|---|
| 2,066,996 | Morioka | Jan. 5, 1937 |
| 2,163,124 | Jeffreys et al. | June 20, 1939 |
| 2,244,687 | Goldsmith et al. | June 10, 1941 |
| 2,361,183 | Eddy | Oct. 24, 1944 |
| 2,462,150 | Wilkinson | Feb. 22, 1949 |
| 2,617,337 | Snyder | Nov. 11, 1952 |
| 2,703,755 | Webb et al. | Mar. 8, 1955 |
| 2,747,463 | Biggs | May 29, 1956 |